(12) United States Patent
Anderson et al.

(10) Patent No.: US 7,283,635 B1
(45) Date of Patent: Oct. 16, 2007

(54) HEADSET WITH MEMORY

(75) Inventors: Arthur G. Anderson, Aptos, CA (US); Robert M. Khamashta, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 09/458,353

(22) Filed: Dec. 9, 1999

(51) Int. Cl.
*H04R 1/10* (2006.01)

(52) U.S. Cl. ................... 381/74; 381/384; 455/575.2

(58) Field of Classification Search ............... 381/74, 381/309, 60, 384; 379/395.01, 387.01, 430, 379/404; 455/575.2
See application file for complete search history.

(56) References Cited

U.S. PATENT DOCUMENTS

| | | | | |
|---|---|---|---|---|
| 4,425,481 A | * | 1/1984 | Mansgold et al. | 381/317 |
| 4,788,708 A | * | 11/1988 | Hendrix | 379/22.02 |
| 4,876,712 A | * | 10/1989 | Brint et al. | 379/387.01 |
| 4,879,746 A | * | 11/1989 | Young et al. | 379/399.02 |
| 4,975,949 A | * | 12/1990 | Wimsatt et al. | 379/387.01 |
| 4,992,966 A | * | 2/1991 | Widin et al. | 702/103 |
| 5,210,803 A | * | 5/1993 | Martin et al. | 381/315 |
| 5,448,646 A | * | 9/1995 | Lucey et al. | 381/74 |
| 5,541,840 A | * | 7/1996 | Gurne et al. | 701/33 |
| 5,729,603 A | * | 3/1998 | Huddart et al. | 379/395.01 |
| 5,734,713 A | * | 3/1998 | Mauney et al. | 379/395 |
| 5,764,778 A | * | 6/1998 | Zurek | 381/312 |
| 5,881,103 A | * | 3/1999 | Wong et al. | 375/229 |
| 6,201,875 B1 | * | 3/2001 | Davis et al. | 381/314 |
| 6,366,863 B1 | * | 4/2002 | Bye et al. | 702/57 |
| 6,438,245 B1 | * | 8/2002 | Taenzer et al. | 381/330 |
| 6,445,805 B1 | * | 9/2002 | Grugel | 381/330 |
| 6,453,042 B1 | * | 9/2002 | Roach et al. | 379/395 |
| 6,466,677 B1 | * | 10/2002 | Bush | 381/300 |
| 6,530,083 B1 | * | 3/2003 | Liebenow | 725/46 |
| 2002/0003889 A1 | * | 1/2002 | Fischer | 381/370 |

OTHER PUBLICATIONS

Mack, R., and Shah, T., "Controlling the Spoken Word", Telecommunications Online, http://www.telecoms-mag.com/issues/199811/tci/mack.html, Nov. 1998.

* cited by examiner

*Primary Examiner*—Xu Mei
(74) *Attorney, Agent, or Firm*—Jung-hua Kuo

(57) ABSTRACT

A headset having a built-in memory to store parameter settings relating to headset performance characteristics such as headphone(s) and/or microphone performance characteristics. The performance characteristics can be measured during headset production and stored in the memory. A host adapter may communicate with the headset through a serial communications port of the headset. The host adapter may read the headset performance characteristics and adjust signals transmitted to and received from the headset in accordance thereto. When the headset is used in a system, the system parameters can be manually set and stored in the headset memory. When the headset is used again in the same system, the system parameters can be read from the memory and automatically set. The memory may also store product history information of the headset such as production date, serial and model numbers, and/or any service history.

18 Claims, 6 Drawing Sheets

HEADSET WITH MEMORY

FIELD OF THE INVENTION

This invention relates to the field of headsets for both telecommunications and multimedia applications, and more particularly, to a headset which includes a memory.

BACKGROUND OF THE INVENTION

Headsets are well known in the art and can be used by a variety of persons in a diversity of applications, including telephone operators, radio operators, aircraft personnel, voice recognition business software, computer gaming, and other situations in which "hands-free" access to telecommunication or multimedia systems is desirable. Headsets are typically designed with a plurality of transducers and filtering/compensation circuitry which accompanies each transducer. The filtering/compensation circuitry ensures that the headset operates within certain parameters.

The design and manufacture of headsets normally requires that adjustments be made to the headset transducers and the accompanying filtering/compensation circuitry in order to compensate for manufacturing variations and normalize performance characteristics of the transducers within individual product or customer requirements. For example, during the assembly of a headset, the performance characteristics of the headset microphone transducer is manually tested by first generating an acoustic reference signal at the transducer input with a know amplitude and frequency. The headset's transmit (or microphone) electrical signal characteristics are then adjusted by adjusting the filtering/compensation circuitry implemented within the headset until the measured value falls within the product design specification. Adjustments are typically accomplished by changing a resistor value or adjusting a potentiometer setting. Either solution requires a change or adjustment in electrical filtering/compensation circuitry components which are coupled directly to the printed circuit board (PCB) within the headset capsule. After an initial adjustment is made, the microphone transmit signal characteristics may be continually retested and readjustments may be made until the electronic signal characteristics of the microphone transducer meet the individual design requirements. The headset capsule is then sealed and the final steps in the manufacturing process are completed.

This process of manufacture has several drawbacks. First, the electronic filtering/compensation circuitry must be implemented within the headset, thereby seriously limiting possible design considerations. Further, initial testing and adjustment, which occurs during the manufacturing process, is time consuming and subject to operator error since it is done manually. Each time a transducer is adjusted, it must be subjected to the same conditions as the original test in order to ensure accuracy in adjustment. Finally, many headset assemblies, once completed and sealed, do not allow further testing and adjustment of the individual transducer(s). Accordingly, if there has been any drift or failure in the performance of the transducers during the final stages of assembling the headset or throughout the product life, the same cannot be easily corrected.

Accordingly, what is needed is a more flexible design of headsets which allows for easily testing and quickly adjusting the individual performance characteristics of a headset, both during the manufacturing process and later throughout the life of the headset.

Additionally, headsets are typically used in various telecommunications or multimedia applications by different users. Each time the headset is used in a different application or by a different user, the user must individually adjust audio performance parameters such as volume, tone, balance and the like to their personal requirements. Obviously, each user may have their own preferences for setting these performance parameters. Thus, when there are multiple users for a single headset, the performance parameters must be manually adjusted for each user every time.

For example, in a telecommunications call center it is typical to have three, or more, different agents using the same telephone terminal to headset host adapter combination at different times throughout the day, with each agent having his or her own individual headset. Each agent may have their own individual preferences for the headset application's performance parameters—such as volume, tone, balance, and the like. Requiring each agent to be bothered with remembering preference settings and then readjusting the performance parameters of the host adapter to their individual preferences is both inefficient and time consuming.

A multimedia headset is similar in the need to capture user preferences but with electrical connection and signal performances that follow less demanding adjustment requirements to the audio interface than most telecommunications headsets. However, multimedia computer headsets still require a user to adjust the performance parameters (volume, tone and balance) each time the headset is used.

Accordingly, what is additionally needed is a means to automatically adjust the performance parameters of an application as each individual headset is used within a telecommunications or multimedia application without requiring the individual user to reset the performance parameters.

SUMMARY OF THE INVENTION

The invention is for telecommunications and/or multimedia headsets which include memory. Preferably, the memory is implemented within a cable quick disconnect of the headset and is used to store and communicate various information back and forth between a host application and the headset. This information may include the headset product manufacturing information, raw performance characteristics of the headset, and individual user preferences for setting performance parameters of the host application. Alternatively, the memory may be implemented within one of the headphone capsules of the headset.

In one aspect of the invention, the memory is an electronic digital read-write nonvolatile memory with a serial communications port, which is built directly into a cable quick disconnect of the headset during manufacture of the headset. Using the memory and automated testing procedures, the headset transducers' (microphone and earphones) raw performance characteristics may be measured and recorded before production of the headset is complete (before the headphone capsules are sealed). These characteristics represent the raw performance characteristics of the transducers within the headset without any electronic filtering/compensation circuitry.

One particularly beneficial aspect of the memory of the headset is the ability to simulate operation of gain control (compensation) and filtering circuitry as if it were actually implemented within the headset. Traditionally, headsets are designed to include optional gain control and filtering circuitry. This circuitry poses serious cost and design considerations which limit headset design, performance, and market sales. However, in designing a headset with memory in accordance with the present invention, these considerations can be eliminated altogether. Headsets may be designed without the optional gain control and filtering circuitry which has been traditionally employed. Instead, the raw transmit and receive characteristics of the headphone and microphone transducers can be measured without any optional circuitry connected within the headset. These raw transmit and receive characteristics can then be read by a configurable host application having gain control and filtering circuitry or digital signal processing capability. The host application can then adjust transmit and receive signal characteristics using it's gain control and filtering circuitry or digital signal processing capability in order to maximize headset performance without sacrificing design considerations.

Use of the memory and automated testing procedures further eliminates the possible operator error, which exists in the prior art in measuring these raw performance characteristics of the headset. Additionally, use of the memory with automated testing procedures allows the individual headset transducer performance characteristics to be measured, recorded, and retrieved even after production of the headset is complete at any time by simply connecting the headset to an appropriate test device. This form of manufacturing trace-ability allows for the highest level of product quality control. At any point in time, before or after production, the performance characteristics can be measured and compared to the original individual design requirements. Moreover, the individual design requirements may be stored in the memory for future reference so the transducers' (earphones and microphone) performance characteristics may continue to be measured and compared with the individual design requirements.

In a further aspect of the invention, a headset with memory is implemented for use within a telecommunications or multimedia system application. In one preferred embodiment, the telecommunications or multimedia systems application includes a host adapter for interfacing with the headset with memory and, optionally, multiple headset accessories. The host adapter includes a memory access device, such as a microprocessor or micro-controller, for communicating with the memory. The headset's raw performance characteristics which are stored within the memory are read by the host adapter, in order to allow the host adapter or systems application to adjust its transmit and receive signals using filtering/compensation circuitry implemented directly within the host adapter or systems applications thereby compensating for performance variations which may exist from headset to headset without requiring expensive and intricate filtering and compensation circuitry to be implemented directly within the headset.

For example, a particular headset may have certain performance characteristics related to the performance of the headset headphone(s) and/or the headset microphone. The performance characteristics for the headphone(s) might include a received signal to noise ratio, a received signal gain or a frequency response. The performance characteristics of the microphone may include a transmit signal to noise ratio, a transmit signal gain, or a transmit frequency response (amplitude versus frequency). Preferably the headset is connected to a host adapter and transmits/receives audio signals to/from a host adapter in conformity with these performance characteristics. By storing these characteristics in the memory of the headset, the host adapter can read these characteristics and know the expected transmit and receive performance characteristics of the headset. The host adapter may then easily adjust the signals it transmits to and received from the headset in order to improve performance of the overall system.

In a further aspect of the invention, a headset with built-in memory may store application specific and/or user preference settings for performance parameters of the host adapter or systems application such as the volume, tone, balance, and other settings. Therefore, once a system is fully user configured, where all preferences for the performance parameters of the host adapter or systems application have been selected, these settings of performance and function can be stored within the headset memory and automatically retrieved the next time the headset is connected with the host adapter or systems applications which supports the stored parameters and functions. This saves a user from having to manually reset the performance parameters of the host adapter or systems application if they where changed by another user.

Moreover, multiple system profiles, one profile for each host system where a headset is used by the same user in multiple system applications (i.e. home or office, telephone or computer multimedia), may be stored within the memory of the headset. When the headset is reused within either of these systems, a corresponding profile would be selected, and the user defined preferences and settings for the performance parameters of the respective host adapter or systems application would be automatically retrieved from the memory and adjusted for within the particular system. More specifically, if the headset is used by the same user within several different systems applications, with each individual systems application having a different host adapter, the user's preferences for the performance parameters of each host adapter, such as volume, tone, balance and the like, can be set by the user when used with each different host adapter. The settings for these system preferences are then stored in different profiles within the memory of the headset, with one profile for each system. Moreover, a standard set of functional parameters may be shared across multiple systems such as volume preference. The next time the headset is used in one of the compatible systems, the appropriate profile can be used to automatically configure and set the performance parameters of the host adapter.

In a further aspect of the invention, multiple users of the same headset may each store their own user defined preferences for performance parameters of a host adapter or systems application, which may be automatically recalled the next time the headset is used. Preferably, this feature is utilized in a call distribution center where multiple users may utilize the same headset and host adapter. Multiple user profiles with different preference settings for the performance parameters of the host adapter may be created and stored within the memory. When a particular user logs into the call center, the user is identified and appropriate preference settings for that user are retrieved from the memory. Alternately, the particular user logs in, the user is identified, and the application then reads last settings and writes an update to the headset memory with the current application specific user parameters.

In yet another aspect of the invention, in a call distribution center each agent or operator may have his or her own headset which may be used to store his or her user call center identification. This user call center identification may be used for detecting agent availability in routing calls to the agent or operator.

In still a further aspect of the invention, product specific information regarding the headset may stored within the memory, identifying the headset serial number, production date, point of sale, and service history for the particular headset into which the memory is built. This can be used to track the production, distribution, and service history of various headsets in order to streamline production and facilitate future services.

DESCRIPTION OF THE DRAWINGS

The present invention has other advantages and features that will be more readily apparent from the following detailed description of the invention and the appended claims, when taken in conjunction with the accompanying drawings, in which:

DETAILED DESCRIPTION OF PREFERRED EMBODIMENTS

Preferred Structural Embodiment

Figure 1:
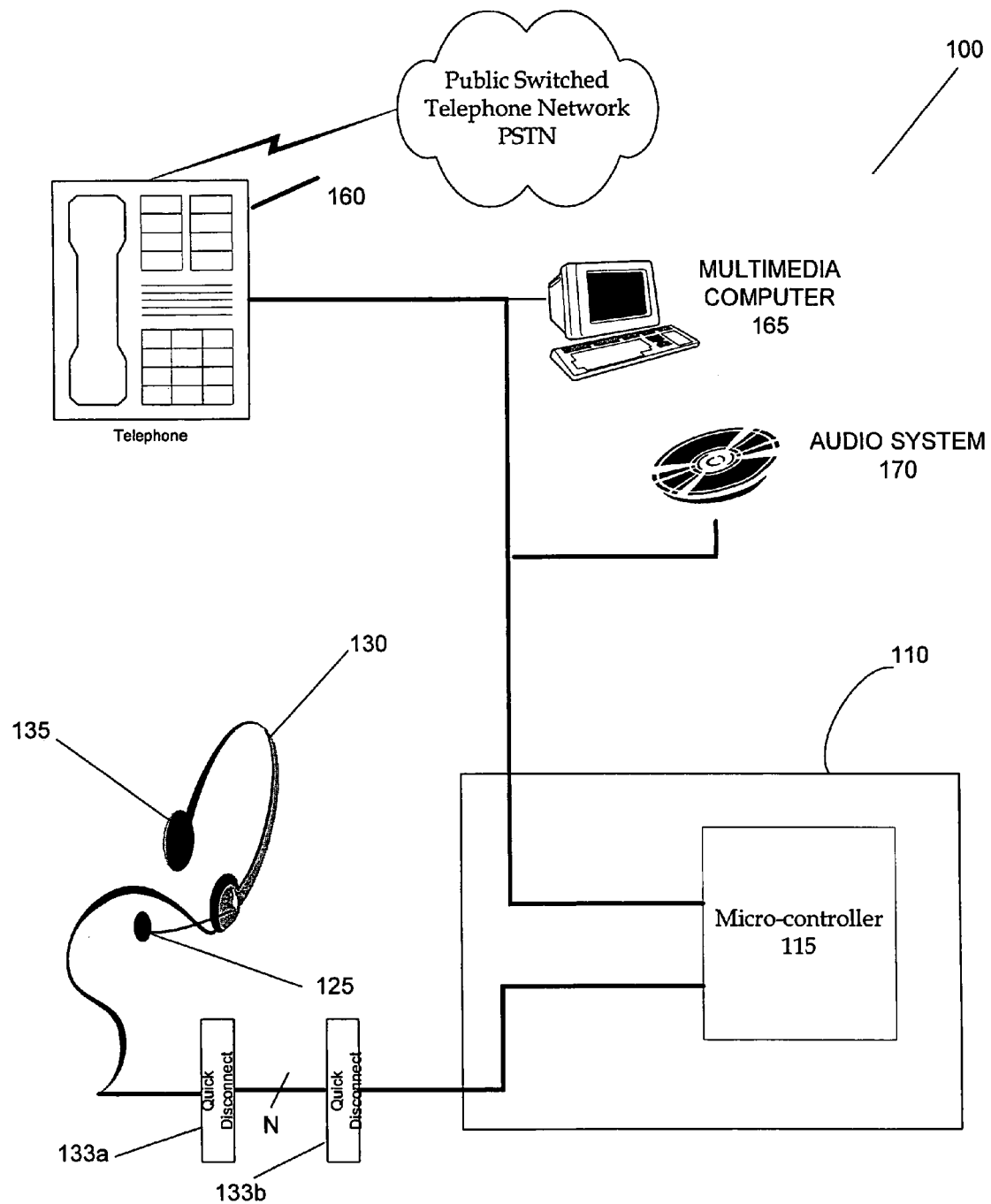
FIG. 1 illustrates a system including an applications system (telecommunications or computer multimedia) and a headset having a built-in memory in accordance with the present invention.

FIG. 1 illustrates a system 100 which includes a headset 130 having a memory in accordance with the present invention, a host adapter 110 and a telephone 160. The headset 130, as shown, is generally a dual headphone configuration having at least one microphone assembly 125. Alternatively, the headset 130 may have a single headphone configuration. The headset 130 includes a memory that is preferably implemented within an upper portion of a cable quick disconnect 133a of the headset. Alternatively, the memory may be implemented directly within one of the headphone capsules 135.

The memory is preferably a digital read-write non-volatile memory that is implemented on a printed circuit board (PCB) and accessible through a serial communications port. Preferably, the memory is an EEPROM memory chip such as an SOT23-5 memory chip package with an I²C two wire digital serial communications interface. The I²C digital serial communications interface is an industry standard digital serial communications interface known in the art which establishes a simple serial communications protocol for embedded processor systems. Alternatively, the memory may be implemented using any other cost efficient memory technology such as optical or magnetic storage. Further, communications with the memory may encompass any other serial or parallel digital or analog design architectures and protocols.

As shown in FIG. 1, the headset 130 is preferably coupled to a host adapter 110 through a multi-wire line (including N wires) and upper and lower portions 133a-b of a multi-pin cable quick disconnect, with each pin in the cable quick disconnect coupling one wire in the multi-wire line from the headset to the host adapter. Generally, several of the wires in the multi-wire line are for conducting audio signals back and forth between the microphone assembly 125 and the earphones of the headset 130 and the host adapter 110. Additionally, several of the wires are for conducting digital serial communications signals back and forth between the memory of the headset 130 and the host adapter 110, with at least one wire preferably used for conducting memory address location information and data to/from the location, and at least one other wire used for a serial clock which provides for synchronous transmission of digital information to and from the memory.

Alternatively, the headset 130 may be coupled directly to the host adapter 110 through an interface jack or port using any appropriate interface which is configured for conducting audio signals, memory address location information and digital data for storage to or retrieval from the memory.

Further, to minimize the total number of wires (N) in the memory headset cable some or all of the audio wires can also share connections for the serial communication with the memory. This is needed because, if a typical 4 wire headset (2 for microphone and 2 for single earphone) were used, at least 3 separate wires would be required for communication of digital data with an I²C memory chip. Accordingly, a total of 7 wires would be needed in such a memory headset cable. As an example of wire reduction, it is preferred that the digital serial ground/common is connected with one of the earphone wires and the memory voltage source would be coupled through the other earphone wire. The serial address and data would be communicated on a separate wire and the serial clock could be coupled across both microphone wires. In this embodiment, only a single wire increase is required in order to have both audio and serial signals communicated to a headset with memory.

The headset host adapter 110 includes a digital processor or micro-controller 215. The micro-controller 215 accesses the memory of the headset preferably through an I²C serial digital interface, or any other serial digital interface, in order to perform read and write memory operations.

As shown in FIG. 1, the headset host adapter 110 is further coupled to any number of application systems. These application systems may include a telecommunications network, a multimedia computer 165 or an audio system 170. The host adapter may configured for coupling to either one of or all of these application systems at the same time. Preferably, the host adapter is coupled to the telecommunications network through a telephone line 160. The telecommunications network may be the public switched telephone network (PSTN) or a dedicated computer network having telephony API (application program interface). Optionally, the multimedia computer in FIG. 1 provides a connection to the PSTN resulting in another telecommunication system or it simply supports voice and audio communications with the headset. In operation the host adapter 110 provides audio signals back and forth between any one of the application systems (i.e. the telecommunications network) and the memory headset 130.

Figure 2:
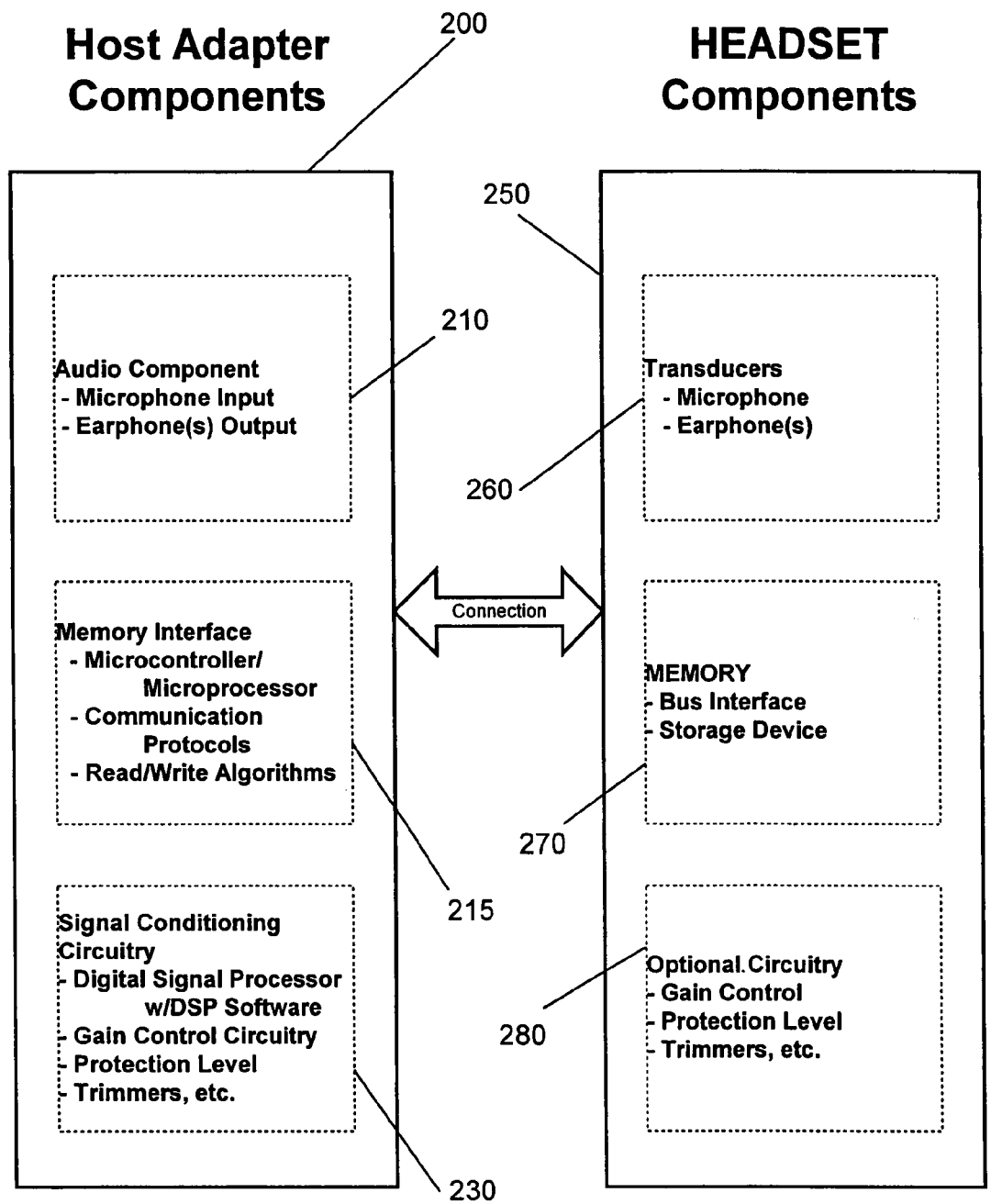
FIG. 2 illustrates a functional block diagram which illustrates the coupling and communications between a headset having a built-in memory in accordance with the present invention and a host adapter.

FIG. 2 illustrates a functional block diagram which illustrates the coupling and communications between a headset 250 having a memory 270 in accordance with the present invention and a host adapter 200. Referring to FIG. 2, a host adapter 200 preferably includes audio components 210, a memory interface 215, and additional signal conditioning circuitry 230. This signal conditioning circuitry may include gain control and noise filtering circuitry. The host adapter 200 is coupled to a headset 250 having a plurality of transducers 260 for communicating analog audio signals back and forth with the audio components 210 of the host adapter 200, a memory 270 for storage of various digital information which may be stored or retrieved by the memory interface 215 of the host adapter 200, and additional optional signal conditioning circuitry 280, which may be implemented within the headset. As explained earlier, the additional optional signal conditioning circuitry 280 may include gain control and noise filtering circuitry. In one preferred embodiment, however, any and all signal conditioning circuitry is implemented within the host adapter 200 in order to minimize design considerations and restrictions which have traditionally plagued prior art headset designs. The interaction between the headset 250 and the host adapter 200 shall now be discussed in further detail.

The host adapter 200 supports conventional audio and/or voice signal transmit and receive functions between the headset and any type of application system (telecommunications, multimedia, and/or audio system) such as those illustrated in FIG. 1. The headset 200 includes a plurality of transducers 260 coupled for receiving and transmitting voice signals to and from the host adapter. For example, the transducers 260 in the headset 250 are used for transmitting audio signals between a microphone assembly and earphone (s) of the headset 250, and the audio components 210 in the host adapter 200. The transducers 260 are preferably implemented within the headset 250 at different locations, with one transducer located within a microphone assembly and one transducer located within each headphone capsule of the headset. Preferably, the headset 250 is a dual headphone configuration with a single microphone assembly; however, optionally, the headset 250 may only include a single earphone or multiple microphone assembly assemblies, in which case the number of transducers 260 varies.

It is understood that the audio components 210 of the host adapter 200 receive audio signals from the transducer within the microphone assembly of the headset 250 and converts the audio and frequency levels of these signals, as appropriate, for coupling the audio signals to any one of the application systems shown in FIG. 1. For example, the host adapter may couple audio voice signals between the headset and a telephone 160 coupled to a telecommunications network (a shown in FIG. 1). In this embodiment, the audio components 210 in the host adapter 110 also receives audio signals from the telecommunications network (FIG. 1), through the telephone 160 (FIG. 1) and converts the audio and frequency levels of these received signals, as appropriate, for connection to the transducers 210 within the earphone(s) of the headset 250. This conversion will be based, at least in part, upon the performance characteristics measured during the manufacture of the headset and stored in the memory 27, as will be further described later herein. Accordingly, the memory 270 of the headset 250 may be used to provide digital information to the host adapter 200 which is used by the host adapter 200 in converting the audio and frequency levels of the transmitted and received signals.

The host adapter 200 further includes a memory interface 215 for interfacing with the memory 270 of the headset 250. As explained earlier, the memory 270 is preferably built into one of the headphone capsules 135 (FIG. 1) of the headset, and includes a dual line digital serial communications interface, one line for sending/receiving memory address and data information and the other line for transmitting a clock that synchronizes the serial data. The memory interface 215 preferably includes a micro-controller which provides the addressable memory locations where the information is to be stored or retrieved. Read and write algorithms are implemented within the memory interface 215 for controlling access to the memory and read or write memory operations.

Finally, both the headset 250 and the host adapter 200 may contain additional optional circuitry 280 and/or signal conditioning circuitry 230, respectively. This circuitry may include gain control circuitry, automatic protection circuitry designed to prevent audio shock, and/or audio frequency response compensating filters. These are just examples of some of the additional circuitry which may be contained in either the headset 250 or the host adapter 200. Preferably, this optional circuitry is only implemented within the host adapter in order to maximize the benefits of the headset with memory.

Memory Read or Write Operations

In operation, the memory interface 215 of the host adapter 200 includes algorithms for performing read and write memory operations. Typically the read and write algorithms are stored within a micro-controller and allow the memory interface 215 to access the memory of the headset in order to store and retrieve information to and from the memory 270. The read and write algorithms shall now be described with reference to specific applications; although it is noted that there are many applications in which read/write operations may be performed and the invention is not intended to be limited to those specifically set forth herein.

In a preferred embodiment, the headset with memory of the present invention allows raw performance characteristics of the headset (performance characteristics which are measured without any filtering or compensation circuitry used in the headset) to be accurately measured and stored in the memory during the manufacture and production of the headset. These performance characteristics may be retrieved, re-measured and updated at any time after production of the headset. Using automated testing procedures, the performance characteristics of the headset may be measured at any time and stored within the memory. These performance characteristics may be compared with original performance characteristics which were measured and stored in the memory of the headset during manufacture and production, in order to ensure stability in the product performance. These performance characteristics may include frequency response characteristics, electrical sensitivity characteristics, and impedance characteristics of both the microphone transducer and the earphone transducers.

These raw performance characteristics may then be read from the memory when the headset is used within a system similar to that illustrated in FIG. 1, such that a host adapter 200 may read these raw performance characteristics and adjust filtering and compensation circuitry 230 implemented within the host adapter 200 in order to manipulate the voice and audio signals transmitted back and forth between an application system and the headset through the host adapter 200. Accordingly, storage of the headset performance characteristics allows a host adapter 200 to retrieve these characteristics from the memory 270 and adjust its own transmit and receive signal characteristics in order to efficiently interface with the headset and optimize performance of the headset in the particular application system.

Memory Structure

The memory of the headset preferably includes a number of memory cell locations arranged into a matrix or array. Each memory cell location has its own individual memory address location. Preferably, the array is conceptually organized into memory address blocks, wherein each memory address block contains a plurality of memory cell locations, with all memory cells locations in a particular memory address block containing related information. For example, the memory of the headset may have a memory address block designated for storing the headset performance characteristics, with each memory address location storing a different performance characteristics such that all memory cell locations in the memory address block contain information related to the performance characteristics of the headset. Additionally, a different memory address block may be allocated for storing product specific information regarding the headset, such as the headset serial number, part number or date of manufacture. Thus all addressable memory locations in this memory address block will contain information related to product information about the headset.

Figure 3:
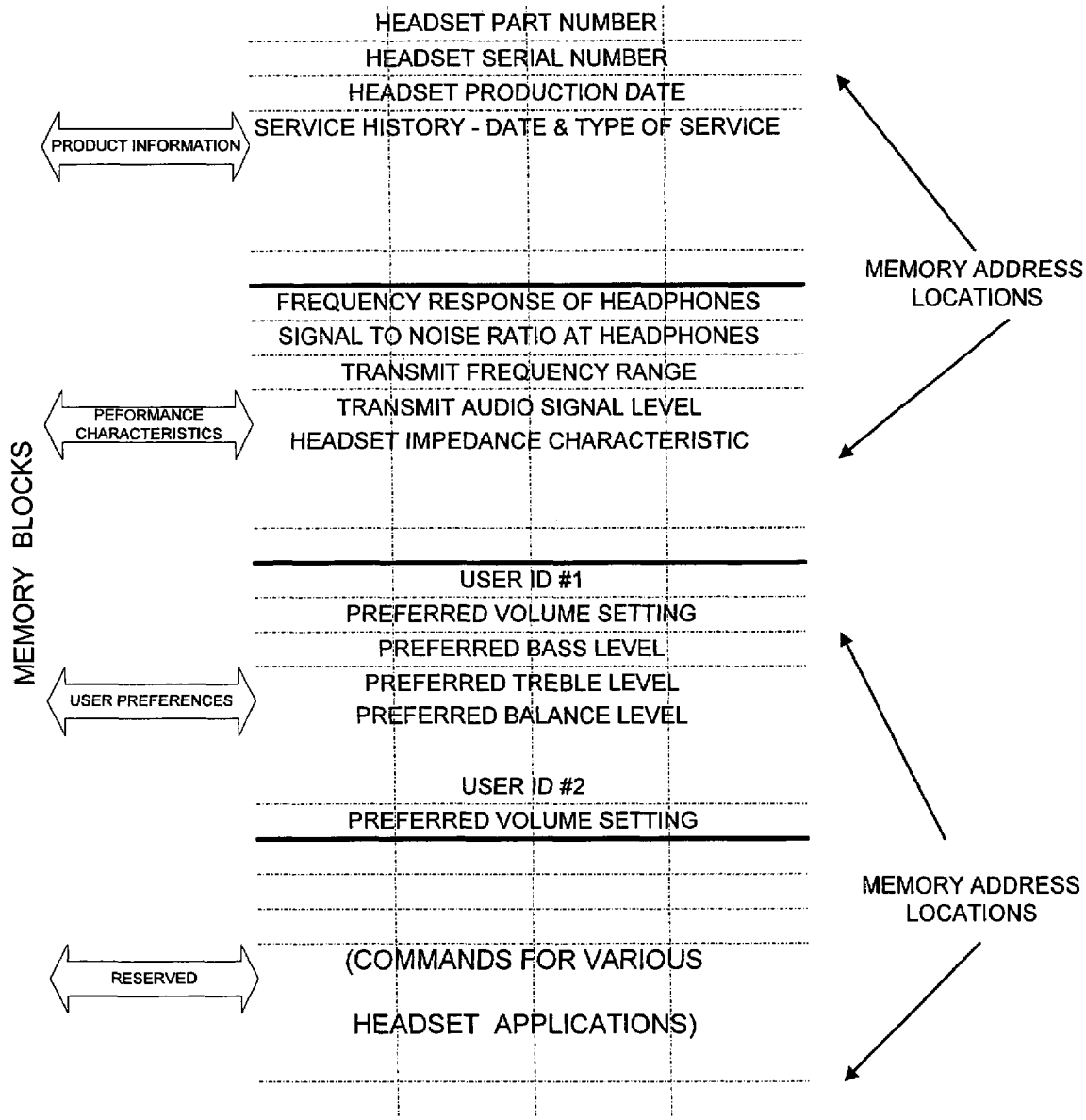
FIG. 3 illustrates a preferred embodiment for the memory of the present invention showing the individual memory block address structure.

FIG. 3 illustrates a diagram of a preferred embodiment of the memory of the present invention, showing the organization of the array of memory locations within the memory of the headset. It is understood that this is only one preferred embodiment for the organization and structure of a memory within the headset, and alternative structures, organizations and embodiments are envisioned. As shown, the array of memory locations are conceptually divided into memory address blocks (as depicted with solid lines) with each memory address block having a predetermined number of addressable memory locations. Each memory address location has a corresponding address and content, wherein the content is the digital information stored at that particular memory address location. In a preferred embodiment, the memory is designed to use eight bit data, or single byte, memory address locations such that there are 256 available digital values that can be stored in each addressable memory locations. A preferred embodiment has 128 different memory address locations. Although, it is understood that the memory may be designed with any number of available addressable memory locations and with any number of bits per memory location.

As shown in FIG. 3, a first block of addressable memory locations is preferably used for storing specific identification information for the headset. This identification information may contain such items as a part number, serial number, production date, service history (including the date of service and type of service provided such as routine maintenance or replacement part service), and the like.

A second block of memory address locations may be used for storing the performance characteristics of the headset, such as receive frequency response characteristics of the headphone(s), sensitivity characteristics of the headphone(s), signal to noise ratio of the received signal at the headphone(s), transmit frequency response characteristics of the microphone assembly, sensitivity of the microphone assembly, overall headset impedance characteristics, or any other performance characteristics of the headset.

Alternatively, this second block may be used to store filtering and compensation circuitry parameters and settings based upon the measured raw performance characteristics of the headset. For example, assume a certain transmit signal level and frequency is desired to meet requirements of an applications system. The raw transmit performance characteristics of the microphone assembly of the headset may be measured. Based upon these raw transmit performance characteristics, any one of a plurality of predetermined values for setting filtering and compensation circuitry implemented within the host adapter may be stored in the memory, where these values will be used by the host adapter to alter signals transmitted from the headset to an application system in order to bring these signals into conformity with the desired transmit signal level and frequency. Likewise, assume a certain receive signal level and frequency is desired to meet requirements of an applications system and enhance system performance. The raw receive performance characteristics of the headphones of the headset may be measured. Based upon these raw receive performance characteristics, any one of a plurality of predetermined values for setting filtering and compensation circuitry implemented within the host adapter may be stored in the memory, where these values will be used by the host adapter to alter signals transmitted to the headset from any application system in order to bring these signals into conformity with the desired receive signal level and frequency.

A third block of addressable memory locations may be used for storing individual user preferred settings for host adapter performance parameters such as volume, tone (bass level and treble level), and balance level between headphone(s). Preferably, when a headset is used by more than one individual, this memory address block is divided up into further sub-blocks with each sub-block corresponding to the preferred performance parameters for each particular user. Accordingly, a first sub-block will contain the preferred settings for the host adapter performance parameters for user #1, a second sub-block will contain the preferred settings for user #2, and so on.

In a preferred embodiment, this memory address block supports a finite number of users. Accordingly, if a new user wishes to store his or her preferred performance parameters for a host adapter and all sub-blocks have previously been assigned or used, the memory will overwrite the oldest information with the new user preferences. For example, assume all sub-blocks have been assigned with information; but, user #1's information is the oldest and user #1 has not used the headset in over six weeks. If a new user to the headset wishes to store his or her preference settings, the memory will overwrite the information sub-block which contains user #1's preferences with the new user's preferences. This concept is explained further hereinafter.

Finally, a fourth block of addressable memory locations may be reserved for storing additional information such as command functions for automatically controlling headset or host adapter operations.

Storage and Retrieval of Headset Performance Characteristics

During the final manufacturing stages of a headset, but presumably after the memory has been installed in the headset capsule, the headset may be coupled to a test device, such as a PC having a multimedia sound card and modem. The test device is preferably configured to transmit various audio test patterns to the headset and measure signal receive performance characteristics—i.e. signal characteristics at the earphone transducers in the headset. The test device is also configured to receive various audio test patterns from the headset and measured the signal transmit performance characteristics—i.e. signal characteristics of the microphone assembly of the headset. These performance characteristics may include such measurements as receive/transmit frequency response, receive/transmit audio levels, impedance characteristics, receive/transmit sensitivity levels, receive/transmit signal to noise ratio and receive/transmit signal gain. It is understood that these are merely exemplary of the types of performance characteristics which may be measured and the foregoing is not intended to limit the types of headset performance characteristics which may be measured by the test device. The headset performance characteristics are automatically measured by the test device. The results from the testing, along with the test pattern used, may be stored in the memory of the headset. Since the process is fully automated there is less chance of operator error and it may be effectively duplicated at any point later in time.

In headsets which include optional circuitry such as filtering and gain control/compensation circuitry, any calibration of the circuitry which may be required in order to bring the performance characteristics of the headset within desired levels may be done. Moreover, even after the headset has been fully calibrated and the manufacturing process completed, the headset can be tested a final time even though the headset capsule has been sealed. Using the memory of the headset, the test pattern stored in the memory can be used to test the headphone(s)/microphone assembly each one final time in order to measure the headset performance characteristics. The results of this final test can be written to the memory.

In a preferred embodiment, each performance characteristic measured during this final test is stored in a predefined memory address location. For example, the receive signal to noise ratio for each of the earphone transducers may be stored at first and second predefined addressable memory locations, while individual receive signal gain characteristics for each of the earphone transducers may be stored at third and forth predefined addressable memory locations.

Later, when the fully manufactured headset is coupled for use with any one of the application systems illustrated in FIG. 1, a host adapter 110 can read the headset performance characteristics directly from the headset memory and set filtering and compensation circuitry levels implemented within the host adapter in order to adjust receive and transmit signals in order to efficiently interface with the headset 130 and optimize performance of the headset 130 with the particular application system.

Figure 4:
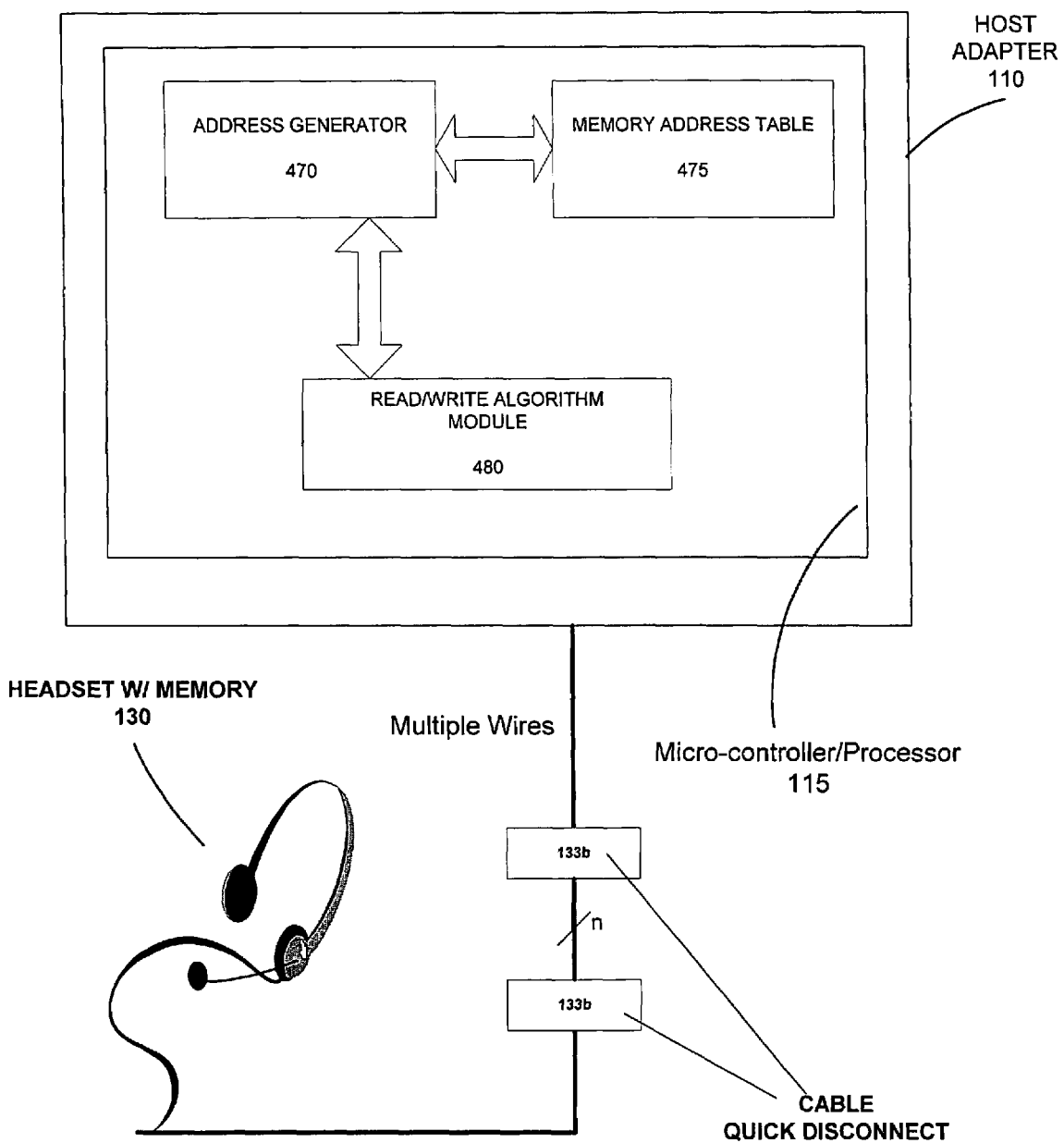
FIG. 4 illustrates a system diagram which depicts communications between the host adapter and the preferred embodiment of the memory.

FIG. 4 illustrates a system diagram depicting the preferred structural components used in performing read/write operations from and to the memory of the headset. As illustrated in FIG. 4, the system includes a headset 130 with memory and a host adapter 110 for retrieving the headset performance characteristics which have been previously stored in the memory of the headset 410 during the final production stages of the headset. The host adapter 110 preferably includes a host processor micro-controller 115 which controls all memory access and read/write operations. The micro-controller 115 of the host adapter 110 preferably includes an address generator 470, a memory address table 475, and a read/write algorithm module 480. The memory address table 475 correlates all of the addressable memory locations in the memory of any given headset with the respective contents. The address generator 470 is used to generate the respective memory address location where the read or write operation is to occur. The read/write algorithm module 480 generates the read or write request which is executed by the micro-controller 115 of the host adapter 110.

Using the address generator 470, the memory address table 475, and the read/write algorithm module 480, the micro-controller 115 can access any address in the memory in order to read or write information from or to the memory respectively. For example, it is assumed that memory address location 0 is preferably always used to store the serial number of a headset and that this is constant in any given headset. Accordingly, the memory address table 475 indicates that addressable memory location 0 corresponds with the memory address location which holds the serial number. Therefore, whenever a host adapter 110 needs the serial number of a connected headset with memory, the host adapter may refer to the memory address table 475 and thereafter knows that address location 0 is always used to store the headset serial number.

In operation, the micro-controller 115 will execute the read/write algorithm for reading the headset serial number. The read/write algorithm will cause the micro-controller 115 to look up the corresponding address in the address table 475. Once the micro-controller 115 obtains the corresponding address, it will instruct the address generator 470 to generate the corresponding address. Finally, the micro-controller 115 will send a read signal and the corresponding address out to the memory of the headset 130 through the serial communications port, thereby reading the contents of the corresponding address location.

As explained earlier, multiple headset performance characteristics are preferably stored within a block of addressable memory locations within the memory, wherein each address within the block is used to store a predefined performance characteristic. The memory address table 475 correlates the predefined performance characteristic with its memory address location such that whenever the adapter wishes to access a particular headset performance characteristic, regardless of the particular headset, the memory address table contains the proper addressable memory location where the predefined characteristic is stored in the memory.

Alternatively, where setting levels are values are stored for configuring filtering and compensation circuitry implemented within the host adapter 110, a different setting or value will be stored in each addressable memory location. For example, a filtering level may be stored in a first addressable memory location, a gain value for boosting the signal may be stored in a second addressable memory location.

Preferably, when a headset is first connected to the host adapter, the adapter detects the connection. This may be done using any technique known in the art, such as detecting an impedance mismatch. The micro-controller 115 of the adapter then initiates a HEADSET_CONNECT routine. The HEADSET_CONNECT routine consists of a series of read algorithms which are performed each time the connection of a headset is detected. These read algorithms are stored in the read/write algorithm module 480 of the micro-controller 115 and are each serially executed by the micro-controller 115 of the host adapter 110. Performing the HEADSET_CONNECT routine, the micro-controller 115 in the host adapter 110 uses the memory address table 475, address generator 470 and read/write algorithm module 480 to read each of the individual headset performance characteristics or filtering/compensation circuitry settings which are stored in the headset memory one at a time. These performance characteristics or filtering/compensation circuitry settings are then stored in a temporary register within the host adapter. Once all of the performance characteristics and/or filtering/compensation circuitry settings have been read, the host adapter will then preferably set the filtering/compensation circuitry implemented within the host adapter to the appropriate levels in order to adjust its transmit and receive signal characteristics in order to communicate with the headset more efficiently.

Storage and Retrieval of Preferences for Host Adapter Performance Parameters

In a further embodiment, the headset with memory 130 may be utilized to stored user preferences for host adapter or application system performance parameters—such as volume, tone and balance. These user preferences may then later be read from the memory when the headset is once again used with the same host adapter or application system. The host adapter or application system will then automatically adjusts its performance parameters—such as volume, tone and balance, in accordance with the user preferences which are read from the headset memory.

More specifically, in this embodiment, a user will initially connect his or her headset to a host adapter within a system similar to that illustrated in FIG. 1. Preferably, this will be the first time the user will have connected to the system—i.e. the user has never before used his or her headset with this host adapter and system. After the host adapter has performed a HEADSET_CONNECT routine, as described above, and adjusted its transmit and receive signal characteristics, the user manually adjusts the host adapter or application system performance parameters—volume, tone, balance, and the like—to his or her individual user preference. If the host adapter 110 comes equipped with volume, tone and balance controls, this adjustment is preferably done at the host adapter 110. However, in some audio system or multimedia application systems, it may be desirable to make adjustments to the performance parameters—such as volume, tone and balance directly at the application system.

Once the user has set each of these performance parameters to his or her desired preference, the user initiates a write operation by depressing an ENTER button preferably located on the host adapter. Alternatively, the memory may be configured to automatically initiate a write operation some predetermined amount of time after the headset connection has occurred. When the write operation is initiated, the micro-controller 115 of the host adapter detects the depressing of the ENTER button, determines the current settings for each of its performance parameters (which are currently set to the user defined preferences), and automatically stores the current settings for each of its performance parameters in the memory of the headset. In an embodiment where the performance parameters are adjusted directly at the application system, the micro-controller in the host adapter can is preferably configured to measure the performance parameters settings directly from the application system and pass the measured value through to the memory of the headset.

In still an alternative embodiment, the memory may be configured to automatically update at regular intervals. This way, no ENTER button is required. Instead, the user defined preferences will be continually updated. Thus, if a user makes continual adjustments to the performance parameters of the host adapter over the course of use of the headset, this will be captured by the memory, with the last setting being updated regularly.

Referring again to FIG. 4, in order to store the user's preference settings for the host adapter 110 or application system performance parameters (such as volume, bass, treble, and balance), the micro-controller 115 in the host adapter executes a write algorithm for storing each of the individual performance parameters. Using the memory address table 475, the micro-controller 115 will determine which address location is used to store a particular performance parameter, such as volume level, bass level, treble level, balance and the like.

As explained earlier, the memory includes an array of addressable memory locations which are divided into blocks with each block used to stored particular types of information. In FIG. 3, addressable memory locations 128-191 are preferably used to store the user preferences for the host adapter performance characteristics. It is assumed that the first performance parameter to be stored is volume (although it is understood that the performance parameters may be stored in any order so long as each parameter is stored in a single proper memory address location) and that the proper memory address location which is used to store the volume performance parameter is memory address location 130 (as shown in FIG. 3).

Using the memory address table 475, the micro-controller 115 determines which memory address location corresponds with the volume performance parameter (in this case memory address location 130) and instructs the address generator 470 to generate the correct corresponding address. The micro-controller 115 then executes a write algorithm by transmitting to the memory of the headset 130 the memory address location where the performance parameter is to be stored along with the data for the particular performance parameter to be stored (in the case the volume level of the host adapter). This process is repeated until all performance parameters have been stored in their appropriate memory address locations within the memory of the headset.

When the headset is used again with the same host adapter, the micro-controller 115 in the host adapter 110 can access the memory of the headset and automatically retrieve the desired performance parameters from the memory in the headset. The process for retrieving the performance parameters is much the same as that described above in regard to retrieving the headset performance characteristics. When the headset 130 is again reconnected with the same host adapter, the host adapter determines whether the headset has ever been previously connected to the host adapter. Preferably, this is done by identifying the headset by its serial number or other determining information. Once the host adapter 110 determines that the headset 130 has been previously coupled to the host adapter, the micro-controller 115 of the host adapter 110 begins to execute a READ_PARAM routine. This routine is comprised of a number of read algorithms which are stored in the read/write algorithm module 480. As the micro-controller 115 executes the READ_PARAM routine it reads the various user preferred settings for the host adapter performance parameters stored in the memory of the headset. Using the memory address table 475 and the address generator 470, the micro-controller 115 determines corresponding addressable memory locations for each performance parameter, generates the corresponding addresses and performs read operations in order to retrieve each performance parameter from the memory of the headset.

Once all of the performance parameters have been read from the memory of the headset the micro-controller 115 instructs the host adapter 110 to automatically adjust its performance parameters, such as volume, tone (bass and treble) and balance, to the user preferred settings which have been read from the memory of the headset 130. Accordingly, the host adapter 110 will adjust its performance parameters automatically without any need for the user to make any adjustments. Alternatively, the host adapter may be configured such that the micro-controller passes the performance parameter information along with corresponding instructions to the application system so the system can make adjustments to volume, tone and balance directly. This embodiment may be useful in multimedia and traditional audio applications.

Additionally, in another alternative embodiment, a headset with memory in accordance with the present invention may be used by multiple users over various times. For example, the same headset may be used by different users to a system, much as in a call distribution center where multiple users may be assigned to one telephone set over varying shifts throughout the day. In this case, each user uses the same headset within the same system application, however each user may have different desired or preferred levels for setting the performance parameters of the host adapter base or application system.

In this embodiment, each user may individually store their desired preference settings for the performance parameters (volume, tone, balance and the like) levels in the memory, where each user will have their own individual system performance parameters profile. For example, automatic call distribution centers may have multiple users assigned to the same telephone, host adapter and headset during different periods throughout the day. Each user may have different tastes and preferences with regard to setting the performance parameter levels—i.e. volume, tone and balance. With the headset and built-in memory of the present invention, each user can set the host adapter performance parameters to their individual desired levels and store these settings as system performance parameters in the memory of the headset. Each user will have his or her own individual system performance parameters profile and as each user logs into the automatic call detection system, the host adapter may be configured to automatically retrieve that user's preferred performance parameters from the memory and adjust the settings and levels of the host adapter performance parameters in accordance with the user's individually selected desired levels.

Figure 5:
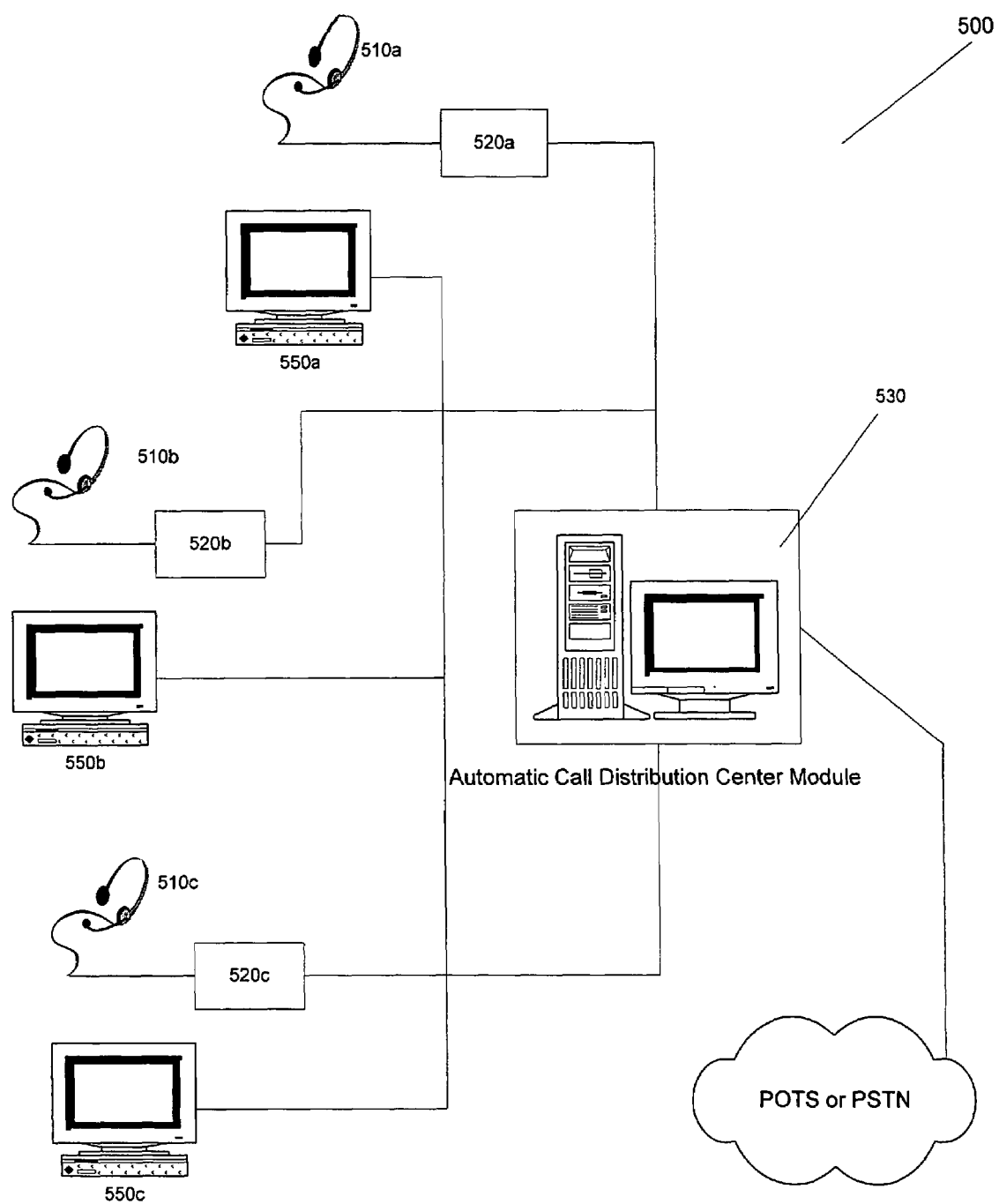
FIG. 5 illustrates an automatic call distribution system which includes multiple headsets each having a separate memory.

FIG. 5 illustrates an other embodiment wherein a plurality of headsets, each headset having its own memory, is used within a system. In the embodiment illustrated in FIG. 5 the system is a telecommunications automatic call distribution center 500. As shown in FIG. 5, an automatic call distribution center 500 includes several different headsets 510a, 510b and 510c, with each headset having its own memory. Each headset is coupled to a corresponding host adapter 520a, 520b, 520c. Each host adapter 520a, 520b and 520c is coupled to an automatic call distribution center module 530. The automatic call distribution center module 530 preferably includes a server which includes telephony software for routing telephone calls to various user operators as they log into the system. Multiple computer terminals 550a, 550b, and 550c are shown as being coupled to the automatic call distribution center module 530. Preferably each one of the computer terminals 550a, 550b and 550c is allocated to a particular headset 510a, 510b and 510c and host adapter 520a, 520b and 520c pair. In this way, it is understood that each of the individual computer terminals is configured for use with one of the headset/adapter pairs by a user operator and has its own associated headset and adapter pair. Additionally, the automatic call distribution center module 530 is coupled to the plain old telephone system (POTS) network through appropriate connections—i.e. conventional telephone lines, wherein the number of lines connected to POTS may vary depending upon the particular automatic call distribution system 500 requirements and configuration.

An operator in the automatic call distribution center initiates use and operation by first logging into the automatic call distribution module 530 through one of the computer terminals 550a, 550b and 550c. Multiple users may log into and use the system at one time, with each user logging onto the system through a different computer terminal. Telephone audio signals are then routed to an appropriate host adapter/headset pair from POTS by the automatic call distribution module 530 as the user operator becomes available. The automatic call distribution center module 530 receives incoming telephone calls from POTS and transfers the calls to the available operators logged into the system. Accordingly, each operator has his or her own headset and adapter.

As explained earlier, throughout the course of a day multiple operators may use the same headset, adapter, and computer terminal in order to log into the system and receive telephone calls. The memory of the headset may be used to reconfigure the performance parameters of a host adapter to user operator defined preferences as each user operator logs into the system throughout the course of the day. Accordingly, when a first user logs into the system, the host adapter will retrieve that user's defined preferences for the host adapter performance parameters from the user's headset and the corresponding host adapter will be configured to set its individual performance parameters to that users defined preferences read from the memory of the headset. Later, when a second user operator logs into the system using the same headset/host adapter pair, that user's predefined preferences for the performance parameters of the host adapter will be retrieved from the memory and the host adapter will reconfigure its performance parameters to that new user's predefined preferences which have been read from the memory of the headset. This process is repeated for each subsequent user operator throughout the day.

Figure 6:
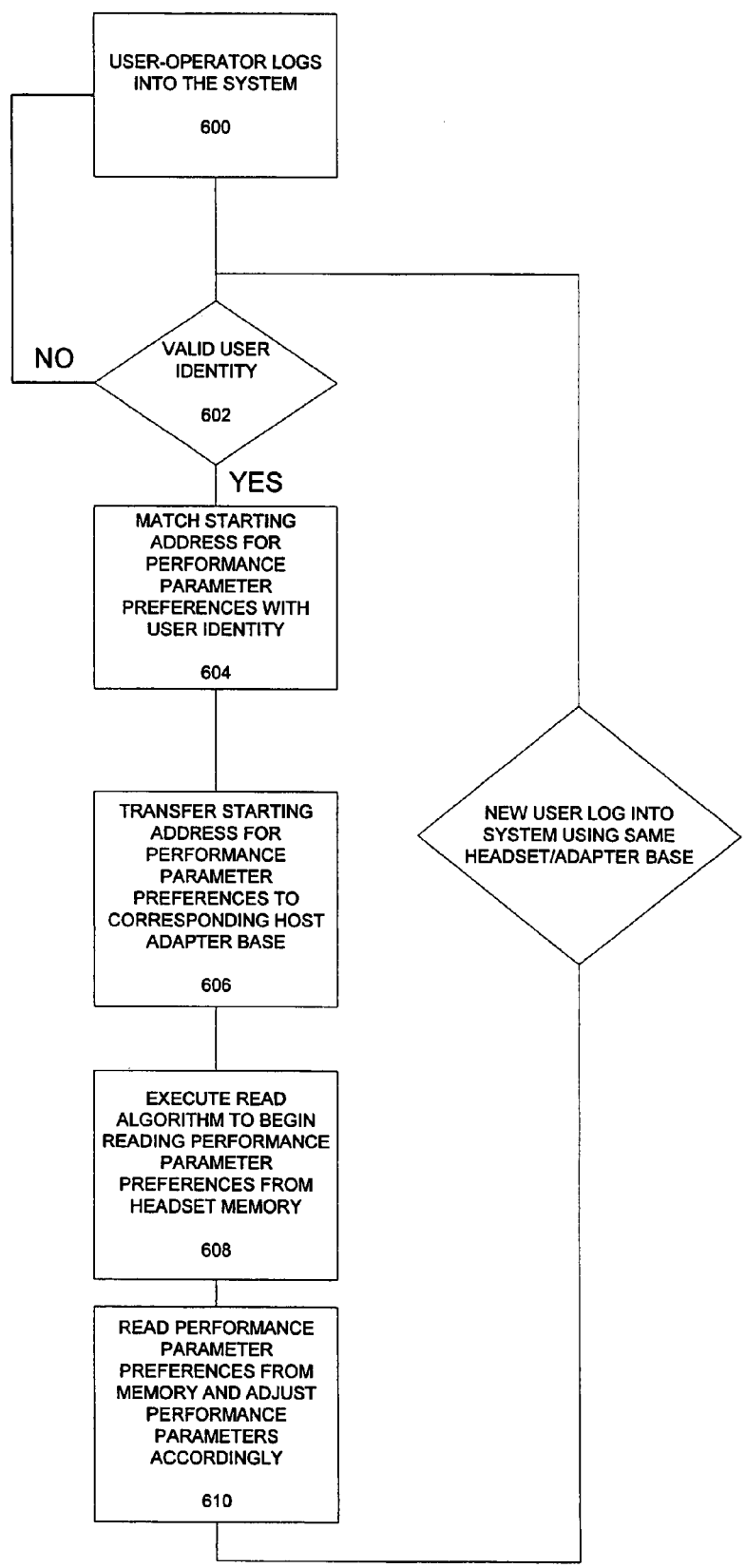
FIG. 6 illustrates a flow diagram showing how individual user defined preferences for performance parameters are retrieved from a headset with memory.

FIG. 6 illustrates a flow diagram showing the steps involved in retrieving from a headset with memory the preference settings for performance parameters where there are multiple users in an automatic call distribution center. Initially, in step 600 a user operator will log into the automatic call distribution center module 530 through one of the PC or computer terminals 550a, 550b, 550c using his or her user personal identification. The personal identification may be a number, a word or a code (such as the operators first initial followed by his or her last name). The process of logging into the automatic call distribution center may occur in any particular way known in the art.

The system then determines whether the user operator is a valid user of the system and determines the identity of the user (Step 602). Once the user logs into the automatic call distribution center, in step 604 the user's identity is matched with a performance parameter starting address by the automatic call distribution center. This starting address represents the starting address where that user's preferences for the settings of the headset adapter performance parameters are stored. Preferably, each user has his or her own performance parameter starting address, where the performance parameters are then stored in blocks within the addressable memory locations of the memory. In step 606, the performance parameter starting address is transferred from the automatic call distribution center module 530 to the appropriate host adapter 520a, 520b or 520c.

For example, a first user may log into the system using a user id such as JCARR. The user identification will be mapped to a performance parameter starting address by the automatic call distribution center module 530. In this example, let us assume such a starting address is memory address location 136 (as shown in FIG. 3). Addressable memory locations 136 through 143 may be used to store this user's preferences for setting the performance parameters of the corresponding host adapter. When the user JCARR logs into the system, the starting address for his user preferences for setting the performance parameters of the host adapter (in this case memory address location 136) is transferred to the corresponding host adapter 520a, 520b or 520c and used as the starting address for reading the performance parameters from the memory of the headset.

Once the performance parameter starting address location has been transferred to the appropriate host adapter, the host adapter begins to execute a READ_PARAM routine (Step 608). This routine is comprised of a number of read algorithms which are stored in the read/write algorithm module 480 of the host adapter. As the micro-controller 460 in the host adapter executes the READ_PARAM routine, it reads the various preferred user settings for the performance parameters at that host adapter from the memory of the headset. Using the memory address table 475 and the address generator 470, the micro-controller 460 determines corresponding addressable memory locations for each performance parameter (volume, tone, balance) and generates the corresponding addresses. The micro-controller 460 of the host adapter then performs multiple read operations in order to read from the memory of the headset each of the previously stored user defined preferences for setting its performance parameters.

Once all of the performance parameters have been read from the memory of the headset, the micro-controller instructs the host adapter to automatically adjust its performance parameters, such as volume, tone (bass and treble) and balance, to the user preferred settings read from the memory of the headset (Step 610).

Later, when a second operator uses the same headset and host adapter pair in the automatic call distribution center, the second operator once again logs into the automatic call distribution center through the associated PC or computer terminal 550*a-c*. The automatic call distribution center once again matches the second operator's identification with a starting address within the headset memory in order to retrieve that user's preferred performance parameters from the memory of the headset, and the process is repeated.

For example, if a second operator logs into the automatic call distribution center using the identification BSACHS, his identification is matched with a new starting address for that his previously stored performance parameter settings, which are stored within the headset memory. This new starting address will be different from that which was matched with the first operator JCARR. For example, the new user BSACHS may have his starting address matched with those user preferences for performance parameter settings which are stored at the beginning address location 144. In this case, addressable memory locations 144 through 151 may be used to store the user BSACHS preferences for setting the performance parameters of the host adapter. The address for memory address location 144 is transferred to the host adapter and used as the starting address for reading the performance parameters from the memory of the headset.

After the new starting address is transferred to the host adapter, the micro-controller 460 in the host adapter once again executes a READ_PARAM routine. As explained earlier, this routine is comprised of a number of read algorithms which are stored in the read/write algorithm module 480. As the micro-controller 460 executes the READ-PARAM routine it reads the various user settings for BSACHS for the host adapter performance parameters from the memory of the headset. Using the memory address table 475 and the address generator 470, the micro-controller 460 determines a corresponding addressable memory location for each performance parameter, generates the corresponding address and performs read operations for each performance parameter.

Once all of the preferred settings for the host adapter performance parameters have been read from the memory of the headset, the micro-controller instructs the host adapter to automatically adjust its performance parameters, such as volume, tone (bass and treble) and balance, to the user preferred settings read from the memory of the headset. Accordingly, the performance parameters of the host adapter are automatically adjusted to the preferred settings of the second operator BSACHS without any user intervention.

It is understood that this process is repeated as each separate user logs into the automatic call distribution center, and the number of users is only limited by the number of address locations available for storing the user defined settings for the host adapter performance parameters.

In yet another alternative embodiment, a memory built-into a headset in accordance with the present invention may be used to record and track the history of the headset. In this embodiment, the memory preferably includes a plurality of memory registers. The plurality of memory registers may be used to store a production date of the headset, a serial number of the headset, and any service dates and/or types of services performed on the headset (including the identification of any replacement parts provided during such service date). The types of services performed may include routine testing services, routine maintenance services, repair services or even replacement of worn out or defective parts. Each time the headset is serviced, the history of the headset can be automatically accessed from the memory prior to performing any service. In this configuration, use of the memory to record the history of the headset can make servicing of the headset easier and more efficient.

In light of the foregoing, the advantages of a headset with memory are numerous, including easier and more reliable testing of headsets during manufacture, enhanced transferability of a headset from one user to another, and automatic configuration of system performance parameters to user defined preferences without the need to readjust the system before each use. Additional specialized applications and embodiments may be further developed in the future. For example, a headset with built-in memory in accordance with the present invention may be used to enhance agent-not-available operations in an automatic call distribution center or to automatically adjust signal levels transferred to and from a headset in accordance with emerging international telephone standards or industry specific requirements.

What is claimed is:

1. An apparatus comprising:
    a headset having a memory for storing a user-adjustable preference setting, the memory being configured to allow the user-adjustable preference setting to be repeatedly modified by the user and stored during use of the headset; and
    a host adapter configured to be selectively coupled to the headset and configured to process audio signals received from and/or transmitted to the headset using a performance parameter set in accordance with the preference setting, wherein the host adapter is capable of accessing the memory in order to read the user-adjustable preference setting.

2. The apparatus of claim 1, wherein the host adapter accesses the memory through a serial port in order to read the preference setting from the memory.

3. The apparatus of claim 1, wherein the memory is implemented with a headphone of the headset.

4. The apparatus of claim 1, wherein the memory is implemented within a cable quick disconnect of the headset.

5. The apparatus of claim 1, wherein the preference setting is one of a preferred volume level, a preferred treble level, a preferred bass level and a preferred balance level.

6. The apparatus of claim 1, wherein the performance parameter of the host adapter may be further manually adjusted by a user to a new preference level, which is then stored in the memory, thereby overwriting the previously stored preference setting.

7. A method for automatically setting performance parameters of a host adapter to various user defined preferences for different users of the host adapter, the method comprising:

storing a first and second set of user defined preferences for a first and a second user, respectively, in a headset having a memory device, the memory being configured to be selectively coupled to the host adapter capable of accessing the memory; and selectively retrieving one of the first and second sets of user defined preferences from the memory when the headset is coupled to the host adapter, and thereafter setting each of the performance parameters of the host adapter to the set of user defined preferences retrieved from the memory, the host adapter being configured to use the performance parameters to process audio signals received from and/or transmitted to the headset, the selectively retrieving being dependent on the headset being used by the first or the second user.

8. The method of claim 7, wherein the first set of user defined preferences includes at least one of a volume level preferred by the first user, a bass level preferred by the first user, a treble level preferred by the first user, and a balance level preferred by the first user.

9. The method of claim 7, wherein the second set of user defined preferences includes at least one of a volume level preferred by the second user, a bass level preferred by the second user, a treble level preferred by the second user, and a balance level preferred by the second user.

10. A system for automatically setting performance parameters of a host adapter to various user defined preferences for different users of the host adapter, the system comprising:

the host adapter configured to use the performance parameters to process audio signals received from and/or transmitted to a headset;

the headset, the headset having memory for storing a first set of user defined preferences for a first user and storing a second set of user defined preferences for a second user;

a memory interface within the host adapter for selectively retrieving the first set of user defined preferences when the headset with memory is selectively coupled to the host adapter and used by the first user, thereafter setting a series of performance parameters of the host adapter to the first set of user defined preferences; and for selectively retrieving the second set of user defined preferences when the headset with memory is selectively coupled to the host adapter and used by the second user, thereafter setting the performance parameters of the host adapter to the second set of user defined preferences.

11. The system of claim 10, wherein the first set of user defined preferences includes at least one of a volume level preferred by the first user, a bass level preferred by the first user, a treble level preferred by the first user, and a balance level preferred by the first user.

12. The system of claim 10, wherein the second set of user defined preferences include a volume level preferred by the second user, a bass level preferred by the second user, a treble level preferred by the second user, and a balance level preferred by the second user.

13. A host adapter for providing signals to and from a headset having a memory device, the host adapter comprising:

an adjustable series of performance parameters for processing the signals provided to and from the headset;

a memory interface for retrieving a first set of user defined preferences when the headset with memory device is selectively coupled to the host adapter and used by a first user, the host adapter thereafter setting the adjustable series of performance parameters of the host adapter to the first set of user defined preferences in order to adjust the signals provided to and from the headset with memory in accordance with the first set of user defined preferences; and for retrieving a second set of user defined preferences when the headset with memory is selectively coupled to the host adapter and used by a second user, the host adapter thereafter setting the adjustable series of performance parameters of the host adapter to the second set of user defined preferences in order to adjust the signals provided to and from the headset in accordance with the second set of user defined preferences.

14. The system of claim 13, wherein the adjustable series of performance parameters include a volume level, a bass level, a treble level, and a balance level.

15. The system of claim 13, wherein the first set of user defined preferences includes at least one of a volume level preferred by the first user, a bass level preferred by the first user, a treble level preferred by the first user, and a balance level preferred by the first user.

16. The system of claim 13, wherein the second set of user defined preferences includes at least one of a volume level preferred by the second user, a bass level preferred by the second user, a treble level preferred by the second user, and a balance level preferred by the second user.

17. A method for retrieving headset preference settings from a headset with memory, comprising:

identifying a headset user selected from a plurality of headset users via a user login;

retrieving a set of headset preference settings associated with the identified headset user from the headset memory by a host adapter, the host adapter being selectively coupled to the headset memory, the retrieving being based on the identity of the headset user, and the host adapter having performance parameters corresponding to the headset preference settings;

setting the performance parameters of the host adapter to the headset preference settings associated with the identified headset user retrieved from the headset memory, the host adapter being configured to process audio signals received from and/or transmitted to the headset using the performance parameters set in accordance with the retrieved set of headset preference settings; and repeating said identifying, retrieving and setting upon each user login.

18. A method of claim 17, further comprising:

matching the identity of the headset user with a performance parameter memory starting address in the headset memory, and transferring the memory starting address in the headset memory to the host adapter, wherein said reading from the headset memory is based on the memory starting address.

* * * * *